US012611680B2

(12) United States Patent
Gramlich et al.

(10) Patent No.: US 12,611,680 B2
(45) Date of Patent: Apr. 28, 2026

(54) SAND KNOCKOUT FOR FRACKING FLUIDS

(71) Applicant: Bestway Oilfield, Inc., Channelview, TX (US)

(72) Inventors: Don Channing Gramlich, Richmond, TX (US); Justin Nicholas Ramirez, Houston, TX (US); Mehul Jain, Humble, TX (US)

(73) Assignee: Bestway Oilfield, Inc., Channelview, TX (US)

( * ) Notice: Subject to any disclaimer, the term of this patent is extended or adjusted under 35 U.S.C. 154(b) by 0 days.

(21) Appl. No.: 19/091,518

(22) Filed: Mar. 26, 2025

(65) Prior Publication Data

US 2025/0303426 A1 Oct. 2, 2025

Related U.S. Application Data

(60) Provisional application No. 63/572,172, filed on Mar. 29, 2024.

(51) Int. Cl.
*B04C 5/13* (2006.01)
*B04C 5/04* (2006.01)
(Continued)

(52) U.S. Cl.
CPC .................. *B04C 5/13* (2013.01); *B04C 5/04* (2013.01); *B04C 5/081* (2013.01); *B04C 5/10* (2013.01);
(Continued)

(58) Field of Classification Search
CPC .. B04C 5/13; B04C 5/04; B04C 5/081; B04C 5/10; B04C 5/103; B04C 5/14; E21B 43/35
See application file for complete search history.

(56) References Cited

U.S. PATENT DOCUMENTS

| | | | | |
|---|---|---|---|---|
| 3,802,570 A | | 4/1974 | Dehne | |
| 3,947,364 A | * | 3/1976 | Laval, Jr. | B04C 5/04 210/512.1 |

(Continued)

FOREIGN PATENT DOCUMENTS

| | | | |
|---|---|---|---|
| WO | 2025169040 A1 | 8/2025 | |

OTHER PUBLICATIONS

Xu et al. "Performance evaluation of a new cyclone separator—Part II simulation results". Separation and Purification Technology 160 (2016) 112-116. (Year: 2016).*

(Continued)

*Primary Examiner* — Liam Royce
(74) *Attorney, Agent, or Firm* — Johnston IP Law, PLLC

(57) ABSTRACT

A cyclonic device for separating mixed fluids includes a body having an inner cavity, a vortex finder disposed within the inner cavity and coupled proximate to a first end of the inner cavity in fluid communication with the inner cavity of the body and a first fluid exit formed within the body, a dome disposed within the inner cavity and coupled proximate to a second end of the inner cavity in fluid communication with the inner cavity of the body and a second fluid exit formed within the body; and an inlet formed within the body for introducing fluid into the inner cavity. A vortex finder may include a tubular member having apertures formed or a plurality of tubulars disposed within a vortex finder body to provide fluid communication between an inner cavity of the vortex finder and an interior of the tubulars.

8 Claims, 15 Drawing Sheets

(51) Int. Cl.

| | |
|---|---|
| ***B04C 5/081*** | (2006.01) |
| ***B04C 5/10*** | (2006.01) |
| ***B04C 5/103*** | (2006.01) |
| ***B04C 5/14*** | (2006.01) |
| ***E21B 43/34*** | (2006.01) |

(52) U.S. Cl.
CPC ................ *B04C 5/103* (2013.01); *B04C 5/14* (2013.01); *E21B 43/35* (2020.05)

(56) References Cited

U.S. PATENT DOCUMENTS

| | | | | |
|---|---|---|---|---|
| 4,212,653 | A | 7/1980 | Giles | |
| 4,778,488 | A * | 10/1988 | Koers | B04C 9/00 95/271 |
| 5,116,488 | A | 5/1992 | Torregrossa | |
| 6,119,870 | A | 9/2000 | Maciejewski et al. | |
| 6,231,645 | B1 * | 5/2001 | Conrad | B04C 5/187 95/271 |
| 7,335,313 | B2 | 2/2008 | Moya | |
| 8,083,838 | B2 | 12/2011 | Yang et al. | |
| 8,114,283 | B2 | 2/2012 | Parkinson | |
| 8,192,614 | B2 | 6/2012 | Niccum et al. | |
| 8,398,751 | B2 | 3/2013 | Yang et al. | |
| 8,678,204 | B2 | 3/2014 | Ford | |
| 8,882,873 | B2 | 11/2014 | Brownlee | |
| 9,079,126 | B2 | 7/2015 | Ford | |
| 9,233,866 | B2 | 1/2016 | Urban | |
| 9,714,561 | B2 | 7/2017 | Hopper | |
| 9,821,257 | B2 | 11/2017 | Arefjord | |
| 10,525,389 | B2 | 1/2020 | Urban | |
| 10,717,026 | B1 | 7/2020 | Anderson et al. | |
| 10,857,487 | B2 | 12/2020 | Marshall et al. | |
| 10,871,062 | B2 | 12/2020 | Gamarra et al. | |
| 10,953,411 | B2 | 3/2021 | Bowley | |
| 11,007,542 | B2 * | 5/2021 | Baaren | B04C 5/103 |
| 11,071,930 | B2 | 7/2021 | Klaveness et al. | |
| 11,344,897 | B1 | 5/2022 | Garcia Soule | |
| 11,779,937 | B1 | 10/2023 | Garcia Soule | |
| 11,806,731 | B2 | 11/2023 | Banerjee et al. | |
| 11,839,883 | B2 | 12/2023 | Bowley | |
| 12,145,160 | B2 | 11/2024 | Bowley | |
| 12,270,289 | B2 | 4/2025 | Keeton | |
| 12,330,173 | B1 | 6/2025 | Garcia Soule | |
| 12,447,478 | B2 | 10/2025 | Moore et al. | |
| 2014/0158364 | A1 | 6/2014 | Hopper | |
| 2016/0121248 | A1 | 5/2016 | Urban | |
| 2018/0353975 | A1 | 12/2018 | Spiridonov et al. | |
| 2019/0262841 | A1 | 8/2019 | Shu et al. | |
| 2020/0016611 | A1 | 1/2020 | Kibler et al. | |
| 2021/0252431 | A1 | 8/2021 | Malone et al. | |
| 2023/0075723 | A1 | 3/2023 | Naidu, D. | |
| 2024/0287887 | A1 * | 8/2024 | Orozco | E21B 43/35 |
| 2024/0375127 | A1 | 11/2024 | Hofer et al. | |

OTHER PUBLICATIONS

International Search Report and Written Opinion received in Patent Cooperation Treaty Application No. 356.0101PTUSPCT/US2025/021660, dated May 14, 2025, 14 pages.

* cited by examiner

SAND KNOCKOUT FOR FRACKING FLUIDS

RELATED APPLICATION

This application claims the benefit of U.S. Provisional Patent Application No. 63/572,172, filed on Mar. 29, 2024, entitled, "Sand Knockout for Fracking Fluids," the disclosure of which is hereby incorporated by reference for all purposes.

TECHNICAL FIELD

This application is directed, in general, to oil and gas recovery and more particularly to sand knockout devices for fracking fluids and other fluids.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Hydraulic fracking works by pumping a fluid at high pressure into a well that creates fractures within a subterranean rock formation to release gas and oil from the subterranean rock. The fluid that is pumped into the well is comprised mostly of water, but may also include sand and other materials.

The oil and gas mixture that is recovered from the well will include water, sand and other materials that will need to be separated from the oil or gas. A separation system may be connected to the wellhead to separate the fluid mixture. Some separator systems utilize a cyclonic system to separate heavier materials, such as sand and water, from the oil and or gas. Improvements remain desirable.

SUMMARY

A cyclonic sand knockout device includes a body having an inner cavity, a vortex finder having a first end and a second end disposed within the inner cavity, a dome disposed within the inner cavity having a first end, a second end, and an inner cavity, an inlet in fluid communication with the inner cavity formed within the body for introducing fluids into the inner cavity of the body, a first fluid exit in fluid communication with the inner cavity formed within the body proximate to the first end of the inner cavity, a second fluid exit in fluid communication with the inner cavity formed within the body proximate to the second end of the inner cavity, a collection chamber in fluid communication with the second fluid exit coupled to the body proximate to the second end of the inner cavity. The inner cavity of the body has a first end and a second end. The vortex finder is coupled to the body proximate to the first end of the vortex finder and proximate to the first end of the inner cavity. The dome is coupled to the body proximate to the second end of the dome and proximate to the second end of the inner cavity. The first end of the dome, the second end of the dome, and the inner cavity of the dome are each in fluid communication with each other and are in fluid communication with the second fluid exit. The vortex finder comprises a tubular member having a first end, a second end, and an inner cavity, wherein the first end, second end, and inner cavity of the tubular member are in fluid communication with each other. The tubular member of the vortex finder has a plurality of flow apertures formed therein, each of the plurality of flow apertures being an elongated slit oriented along a length of the tubular member and being in fluid communication with the inner cavity of the body and being in fluid communication with the inner cavity of the tubular member.

A cyclonic sand knockout device includes a body having an inner cavity, a vortex finder having a first end and a second end disposed within the inner cavity, a dome disposed within the inner cavity having a first end, a second end, and an inner cavity, an inlet in fluid communication with the inner cavity formed within the body for introducing fluids into the inner cavity of the body, a first fluid exit in fluid communication with the inner cavity formed within the body proximate to the first end of the inner cavity, a second fluid exit in fluid communication with the inner cavity formed within the body proximate to the second end of the inner cavity, and a collection chamber in fluid communication with the second fluid exit coupled to the body proximate to the second end of the inner cavity. The inner cavity of the body has a first end and a second end. The vortex finder is coupled to the body proximate to the first end of the vortex finder and proximate to the first end of the inner cavity. The dome is coupled to the body proximate to the second end of the dome and proximate to the second end of the inner cavity. The first end of the dome, the second end of the dome, and the inner cavity of the dome are each in fluid communication with each other and are in fluid communication with the second fluid exit. The vortex finder comprises a body having a first end and a second end, a conical cap having a first end and a second end, a plurality of flow tubes, and an exit tubular having a first end and a second end. The first end of the body of the vortex finder is coupled to the second end of the conical cap. The first end of the conical cap is coupled to the second end of the exit tubular. The body of the vortex finder has formed therein a plurality of flow tube apertures, and each of the flow tubes of the plurality of flow tubes is disposed within one of the flow tube apertures of the plurality of flow tube apertures. Each of the flow tubes is a tubular member having a wall and an inner cavity. A plurality of apertures is formed within the wall of each the flow tubes to allow for fluid communication between the inner cavity of the flow tubes and an exterior of the flow tubes. The body of the vortex finder is sized and configured so that the wall of each flow tubes and the plurality of apertures of each of the flow tubes are exposed to the inner cavity of the vortex finder to allow for fluid communication between the inner cavity of the vortex finder and the inner cavity of the flow tubes. The conical cap comprises a body with an inner cavity formed therein. The inner cavity of the body of the cyclonic sand knockout device, the inner cavity of each of the plurality of flow tubes, the inner cavity of the conical cap, the exit tubular, and the first fluid exit are in fluid communication with each other to create a first fluid flow path from the inner cavity of the body of the cyclonic knockout device to the first fluid exit.

A cyclonic sand knockout assembly includes a ridged framework, a cyclonic sand knockout device coupled to the rigid framework, and a fluid input assembly coupled to the rigid framework. The cyclonic sand knockout device includes a body having an inner cavity, a vortex finder having a first end and a second end disposed within the inner cavity, a dome disposed within the inner cavity having a first end, a second end, and an inner cavity, an inlet in fluid communication with the inner cavity formed within the body for introducing fluids into the inner cavity of the body, a first fluid exit in fluid communication with the inner cavity formed within the body proximate to the first end of the inner cavity, a second fluid exit in fluid communication with the inner cavity formed within the body proximate to the second end of the inner cavity, a collection chamber in fluid communication with the second fluid exit coupled to the body proximate to the second end of the inner cavity. The inner cavity has a first end and a second end. The vortex finder is coupled to the body proximate to the first end of the vortex finder and proximate to the first end of the inner cavity. The dome is coupled to the body proximate to the second end of the dome and proximate to the second end of the inner cavity. The first end of the dome, the second end of the dome, and the inner cavity of the dome are each in fluid communication with each other and are in fluid communication with the second fluid exit. The fluid input assembly includes a plurality of tubulars in fluid communication with each other and in fluid communication with the inlet of the cyclonic sand knockout device forming a flow path for receiving a flow of mixed media fluid and delivering the mixed media fluid to the inlet of the cyclonic sand knockout device and a removably coupled adapter sleave coupled within one of the tubulars of the plurality of tubulars proximate to the inlet of the of the cyclonic sand knockout device having an internal diameter. The internal diameter of the adapter limits the flow of mixed media fluid into the inlet of the of the cyclonic sand knockout device.

Other embodiments are disclosed.

DESCRIPTION OF THE DRAWINGS

Illustrative embodiments of the present invention are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims. Unless otherwise indicated, as used throughout this document, "or" does not require mutual exclusivity.

Figure 1:
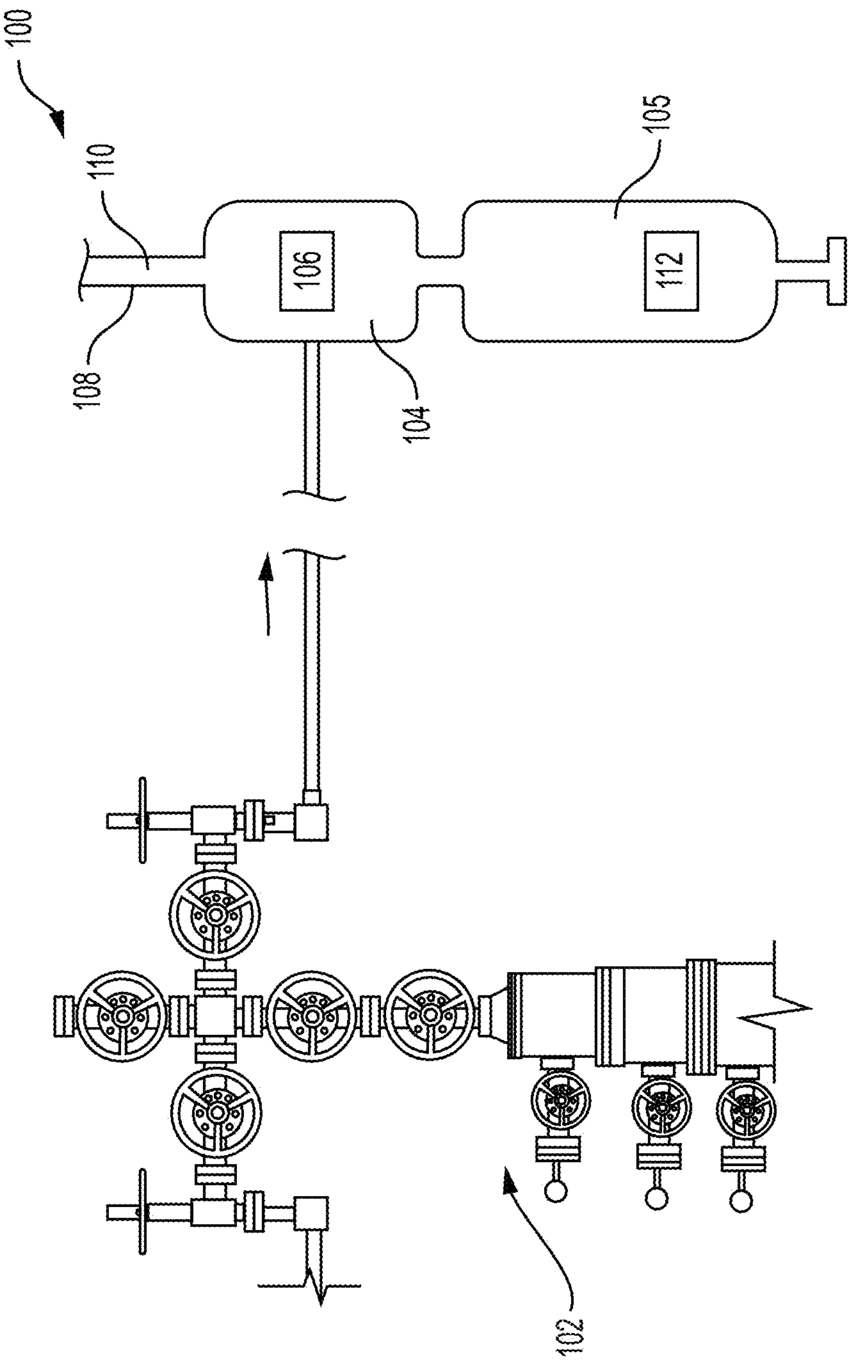
FIG. 1 is a schematic, view of an illustrative embodiment of a cyclonic sand knockout device coupled to a wellhead.

Referring now to FIG. 1, a fracking system 100 includes a wellhead 102 connected to a cyclonic sand knockout device 104. The fracking system 100 is operable to retrieve oil and gas from a subterranean formation (not shown). The oil and or gas retrieved from the subterranean formation includes water, sand and other materials that form a mixed media fluid 106. The mixed media fluid 106 is delivered from the wellhead to the cyclonic knockout device 104 for separation. The cyclonic knockout device 104 is referred to as a device but it should be appreciated it may also be referred to as a system. The cyclonic knockout device 104 separates the mixed media fluid 106 into a first fluid mixture 110, which contains a higher concentration of oil or gas, and a second fluid mixture 112, which contains more sand and water. The first fluid mixture 110 will be transferred to another system (not shown) for further processing and/or storage, for example, by pipe 108. In some embodiments, the second mixture 112 will be transferred to a lower catch vessel 105 (FIG. 1) that is part of the cyclonic knockout device 104 to be stored for further processing.

Figure 2:
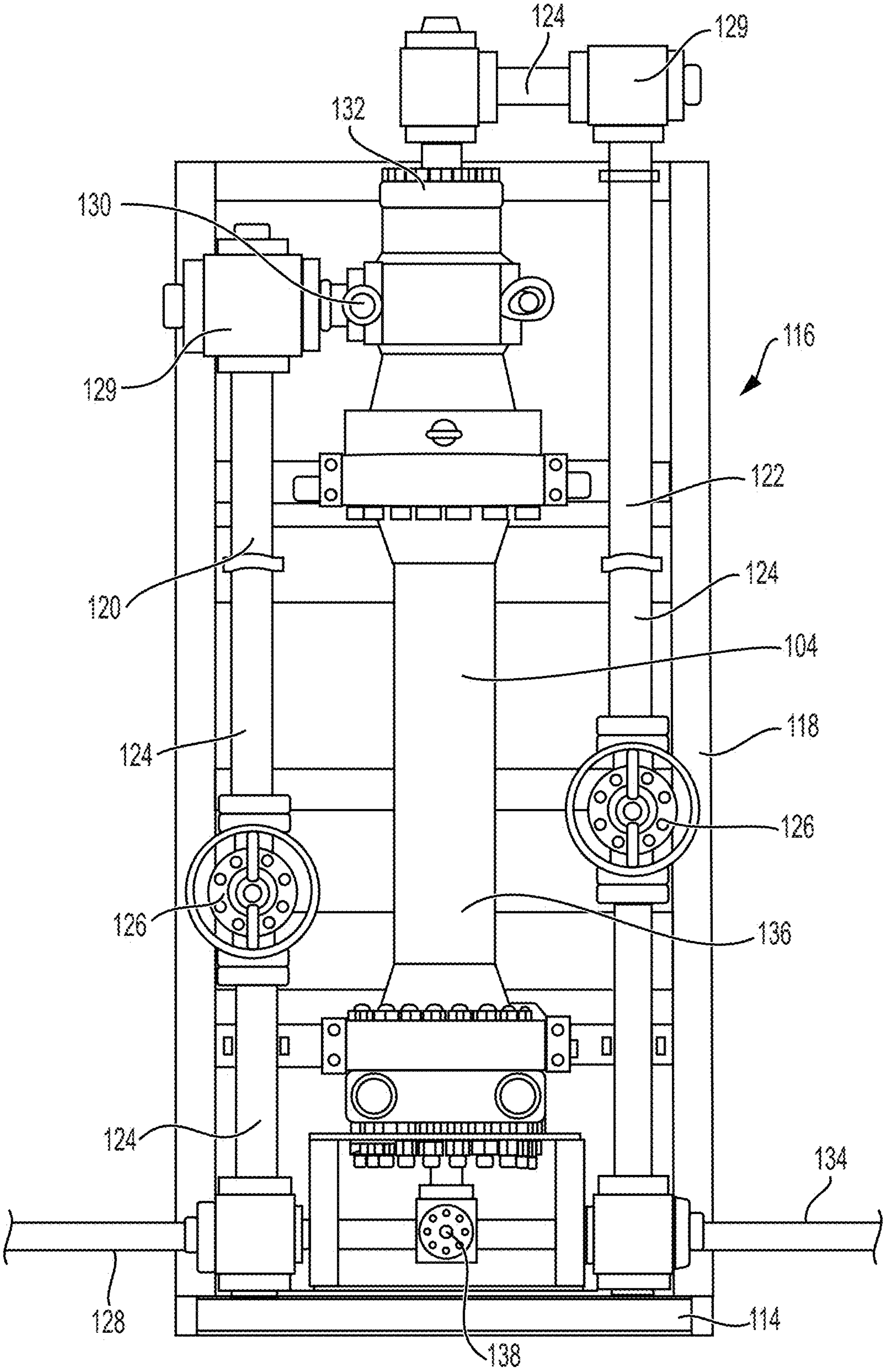
FIG. 2 is a schematic, elevation view of an illustrative embodiment of a cyclonic sand knockout assembly.

Referring now primarily to FIG. 2, further features of an illustrative embodiment of the cyclonic knockout device 104 will be described. The cyclonic knockout device 104 may be mounted onto a skid 114. Mounting the cyclonic knockout device 104 onto a skid 114 forms a knockout assembly 116. The knockout assembly 116 is movable as a unit for ease of transport and installation of the cyclonic knockout device 104. The knockout assembly 116 may also include other components for controlling or routing fluids to and from the cyclonic knockout device 104 that are mounted to the skid 114 or to a ridged framework 118 coupled to the skid 114. For example, the knockout assembly 116 may include a fluid input assembly 120 and a fluid output assembly 122, each coupled to the skid 114 or rigid framework 118 and fluidly coupled to the cyclonic knockout device 104.

Each of the fluid input assembly 120 and fluid output assembly 122 may include one or more tubulars 124 fluidly coupled to the cyclonic knockout device 104. Each of the fluid input assembly 120 and fluid output assembly 122 may include one or more valves 126 coupled to the tubulars 124 for controlling the flow of fluid through the fluid input assembly 120 or fluid output assembly 122. Each of the fluid input assembly 120 and fluid output assembly 122 may include flow blocks 129 fluidly coupled to other components of the fluid input assembly 120 or fluid output assembly 122 for controlling or directing the flow of fluids through the fluid input assembly 120 or fluid output assembly 122.

The mixed media fluid 106 is introduced into the knockout assembly 116 at an input 128 of the fluid input assembly 120. The mixed media fluid 106 travels through the fluid input assembly 120 and enters the cyclonic sand knockout device 104 at a knockout device input 130.

The mixed media fluid 106 is processed within the cyclonic sand knockout device 104, as further describe herein, to produce the first fluid mixture 110 and the second fluid mixture 112 (FIG. 1). The first fluid mixture 110, being less dense than the second fluid mixture 112, exits the cyclonic sand knockout device 104 through a knockout device first fluid exit 132, where the first fluid mixture 110 enters into the fluid output assembly 122. The first fluid mixture 110 travels through the fluid output assembly 122 and exits the knockout assembly 116 at first fluid exit 134 for further processing.

The second fluid mixture 112, being denser than the first fluid mixture 110, is directed into a lower chamber 136 of the cyclonic sand knockout device 104. The cyclonic sand knockout device 104 may be used to continuously separate the mixed media fluid 106 until the lower chamber 136 contains a certain amount of the second fluid mixture 112, at which point, flow to the cyclonic sand knockout device 104 may be stopped, reduced, or paused using valves 126 so that the lower chamber 136 may be emptied. The lower chamber 136 is emptied by draining the second fluid mixture 112 through the second fluid mixture drain 138. Once the lower chamber 136 is sufficiently emptied of the second fluid mixture 112, flow to the cyclonic sand knockout device 104 may be resumed for further processing of the mixed media fluid 106.

Figure 3:
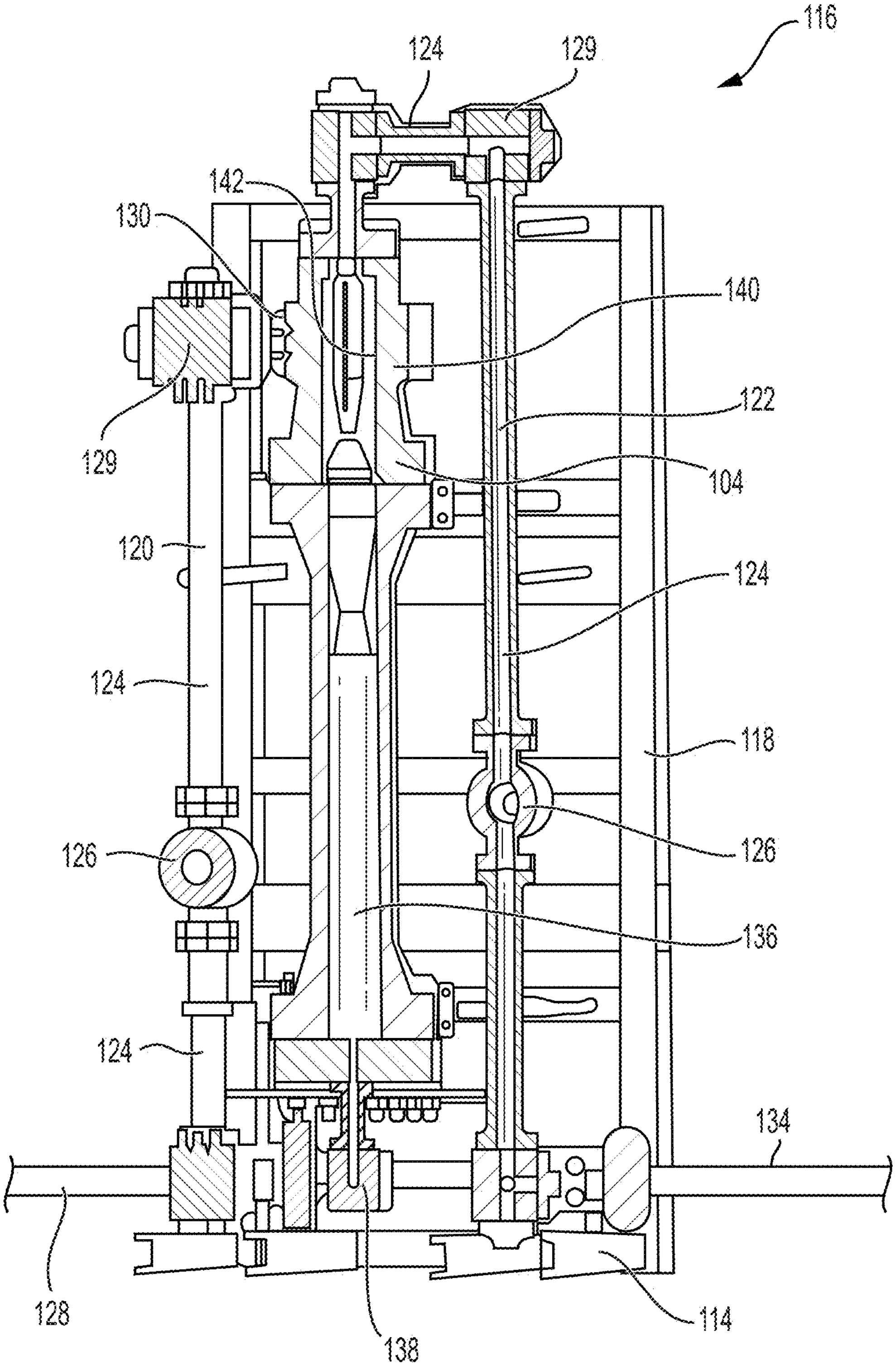
FIG. 3 is a schematic, cross-sectional perspective view of an illustrative embodiment of a cyclonic sand knockout assembly.
Figure 4:
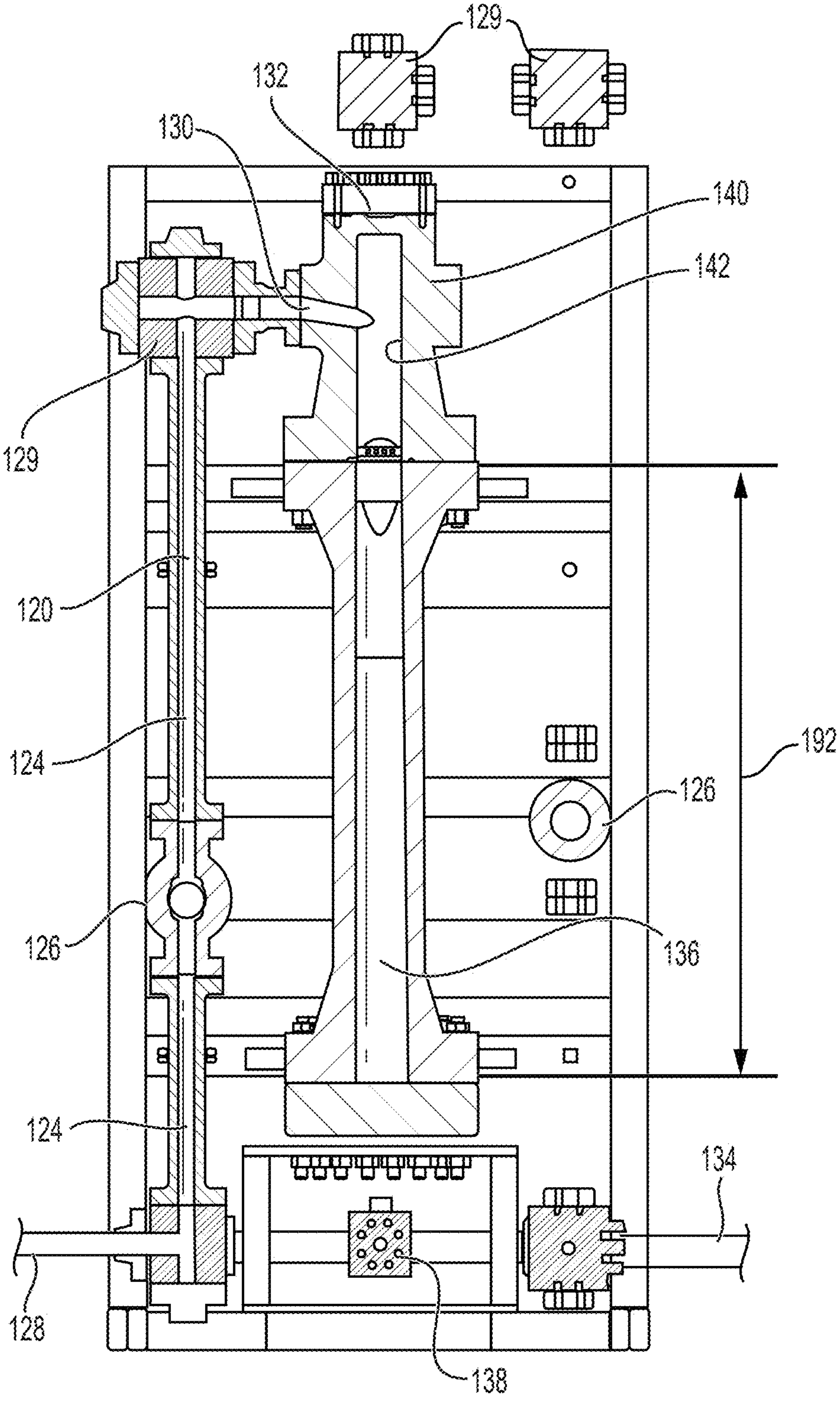
FIG. 4 is a schematic, cross-sectional view of an illustrative embodiment of a cyclonic sand knockout assembly.
Figure 5:
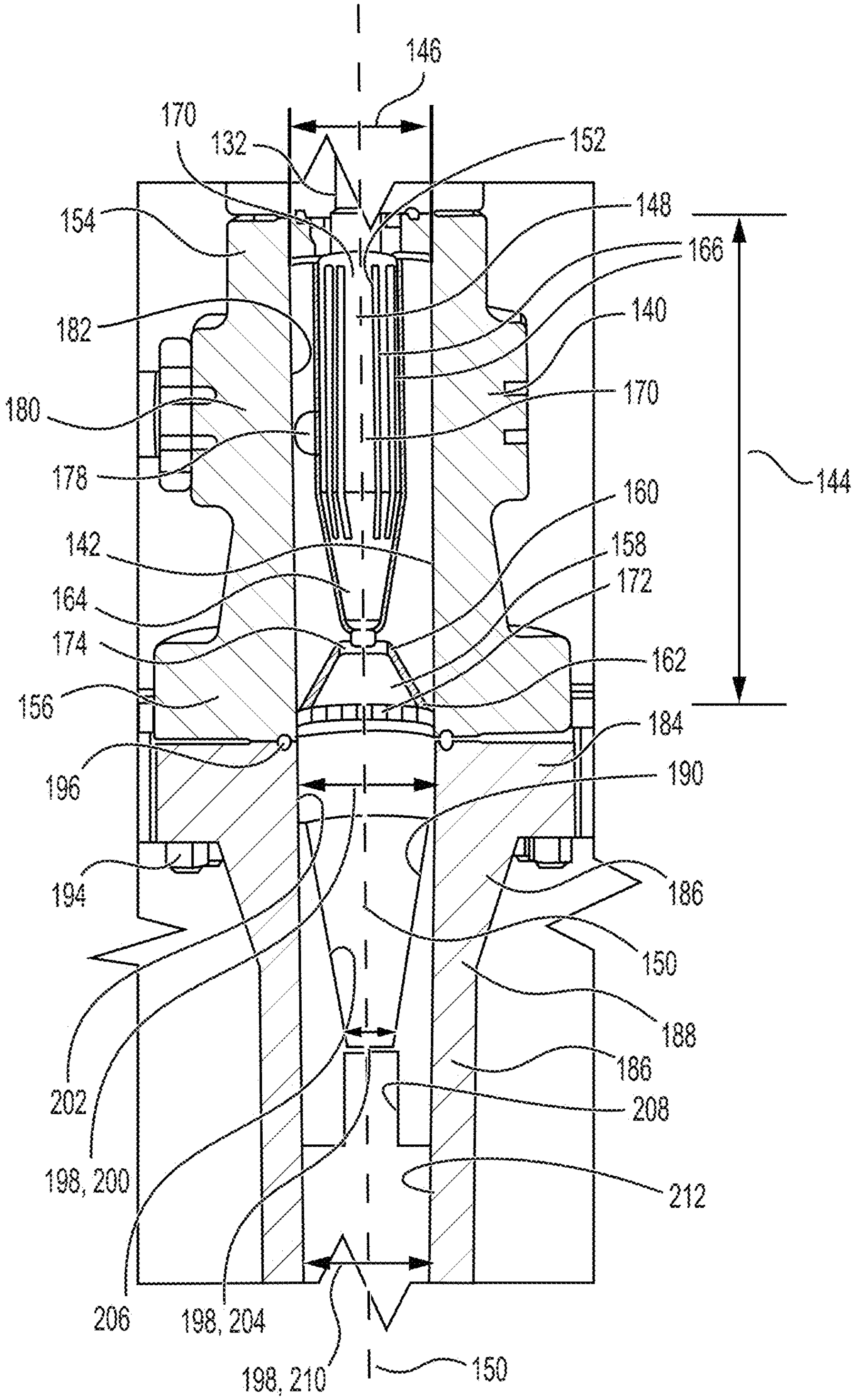
FIG. 5 is a schematic, cross-sectional view of a portion of an illustrative embodiment of a cyclonic sand knockout.

Referring now primarily to FIGS. 3, 4, and 5, additional features of the illustrative embodiment of the cyclonic sand knockout device 104 and of the knockout assembly 116 will be further described. FIG. 3 depicts a cross-sectional perspective view of the knockout assembly 116 with the cyclonic sand knockout device 104 taken at a center plane of the cyclonic sand knockout device 104. FIG. 4 depicts a perspective view of the knockout assembly 116 showing portions of the cyclonic sand knockout device 104 taken at a plane that is offset from the center of the cyclonic sand knockout device 104 and that is on a center plane of the fluid input assembly 120. FIG. 5 depicts a detailed cross-sectional view of a portion of the cyclonic sand knockout device 104 taken on the same plane as that of FIG. 3.

The cyclonic sand knockout device 104 includes a cyclonic body portion 140. The cyclonic body portion has an inner cavity 142. The inner cavity 142 is generally cylindrical in shape and oriented along a length 144 (FIG. 5) of the cyclonic body portion 140. A cross-section of the inner cavity 142 taken along the length 144 may be substantially circular in shape, wherein a width 146 of the inner cavity 142 defines the radius of the cross-section of the inner cavity 142 taken along the length 144. In some embodiments, such as depicted in FIG. 3, the width 146 of the inner cavity 142 may be constant along the length 144. In some embodiments, the width 146 of the inner cavity 142 may vary along the length 144 of the inner cavity 142.

Variations of the width 146 of the inner cavity 142 along the length 144 may be used to modify the qualities of a cyclonic flow within the inner cavity 142. Smaller widths 146 result in less volume for the mixed media fluid 106 to travel, which in turn results in faster cyclonic fluid flow. Large widths 146 result in more volume for the mixed media fluid 106 to travel, which in turn results in slower cyclonic fluid flow.

A vortex finder 148 is coupled within the inner cavity 142. The vortex finder 148 is generally cylindrical in shape and is disposed concentric to a centerline 150 of the inner cavity 142. A first end 152 of the vortex finder 148 is coupled to the knockout device first fluid exit 132 at a first end 154 of the cyclonic body portion 140 to allow the first fluid mixture 110 to exit the cyclonic sand knockout device 104.

A dome 158 is coupled to a second end 156 of the cyclonic body portion 140 so the second fluid mixture 112 can exit the inner cavity 142 at the second end 156 of the cyclonic body portion 140. The dome 158, generally, has a hollow cone shape with a narrower first end 160 and a wider second end 162. The dome 158 is disposed within the inner cavity 142 concentric to the centerline 150 with the narrower first end 160 located proximate a second end 164 of the vortex finder 148.

The vortex finder 148 has one or more slotted openings 166 oriented along the length 144 and a lower center opening 168 to allow for fluid flow into and out of a vortex finder cavity 170. In one embodiment, the slotted openings 166 are apertures that are oriented along the direction of the length 144. In one embodiment, the slotted openings 166 are located closer to the first end 154 of the vortex finer 148 than to the second end 164 of the vortex finder 148. The dome 158 has one or more flow apertures 172 and a center opening 174 to allow for fluid flow into and out of a dome inner cavity 176. In one embodiment, the second end 164 of the vortex finder 148 is located proximate to, but not in contact with, the first end 160 of the dome 158.

In some embodiments, since the vortex finder 148 and the dome 158 are high wear parts, the vortex finder 148 or the dome 158 is removably coupled to the cyclonic body portion 140 so that the vortex finder 148 or the dome 158 may be replaced as needed. In some embodiments, the vortex finder 148 or the dome 158 is removably coupled to the cyclonic body portion 140 by a threaded connection.

A mixed media fluid inlet 178 is formed within a body 180 of the cyclonic body portion 140 of the cyclonic sand knockout device 104. The mixed media fluid inlet 178 provides a flow path for fluids between the fluid input assembly 120 and the inner cavity 142 of the cyclonic body portion 140. As can been seen in FIG. 4, which omits the vortex finder 148 and the dome 158 for clarity, the mixed media fluid inlet 178 is formed within the body 180 of the cyclonic body portion 140 off center from the inner cavity 142. In some embodiments, the mixed media fluid inlet 178 is formed within the body 180 of the cyclonic body portion 140 tangential or near tangential to an inner wall 182 of the inner cavity 142 to induce cyclonic flow of mixed media fluid 106 entering into the inner cavity 142.

The second end 156 of the cyclonic body portion 140 is coupled to a first end 184 of a collection unit 186 of the cyclonic sand knockout device 104. The collection unit 186 has a length 192 that is oriented in the same direction as the length 144 of the cyclonic body portion 140. The collection unit 186 has an inner cavity 190 formed within a body 188. The inner cavity 190 generally has a circular cross-sectional shape with the cross-sectional shapes of the inner cavity 190 being coincident with the centerline 150 of the inner cavity 142 of the cyclonic body portion 140.

The inner cavity 190 has a width 198. Analogous to the width 146 of the inner cavity 142 of the cyclonic body portion 140. The width 198 of the inner cavity 190 of the collection unit 186 may be varied along the length 192 to modify the flow of fluids within the inner cavity 190. In the illustrative embodiment of FIG. 5, the inner cavity has a first width 200, in a first cylindrical portion 202. The width 198 tapers from the first width 200 to a second width 204 in a conical portion 206. The second width 204 remains constant in a second cylindrical portion 208. The width 198 is varied to a third width 210, which is larger than the second width 204, at the transition between the second cylindrical portion 208 and a third cylindrical portion 212.

The cyclonic body portion 140 is coupled to the collection unit 186 by nut and stud connections 194, and the connection between the cyclonic body portion 140 and the collection unit 186 is sealed by a gasket 196. Other means of connection and sealing may be used.

Figure 6:
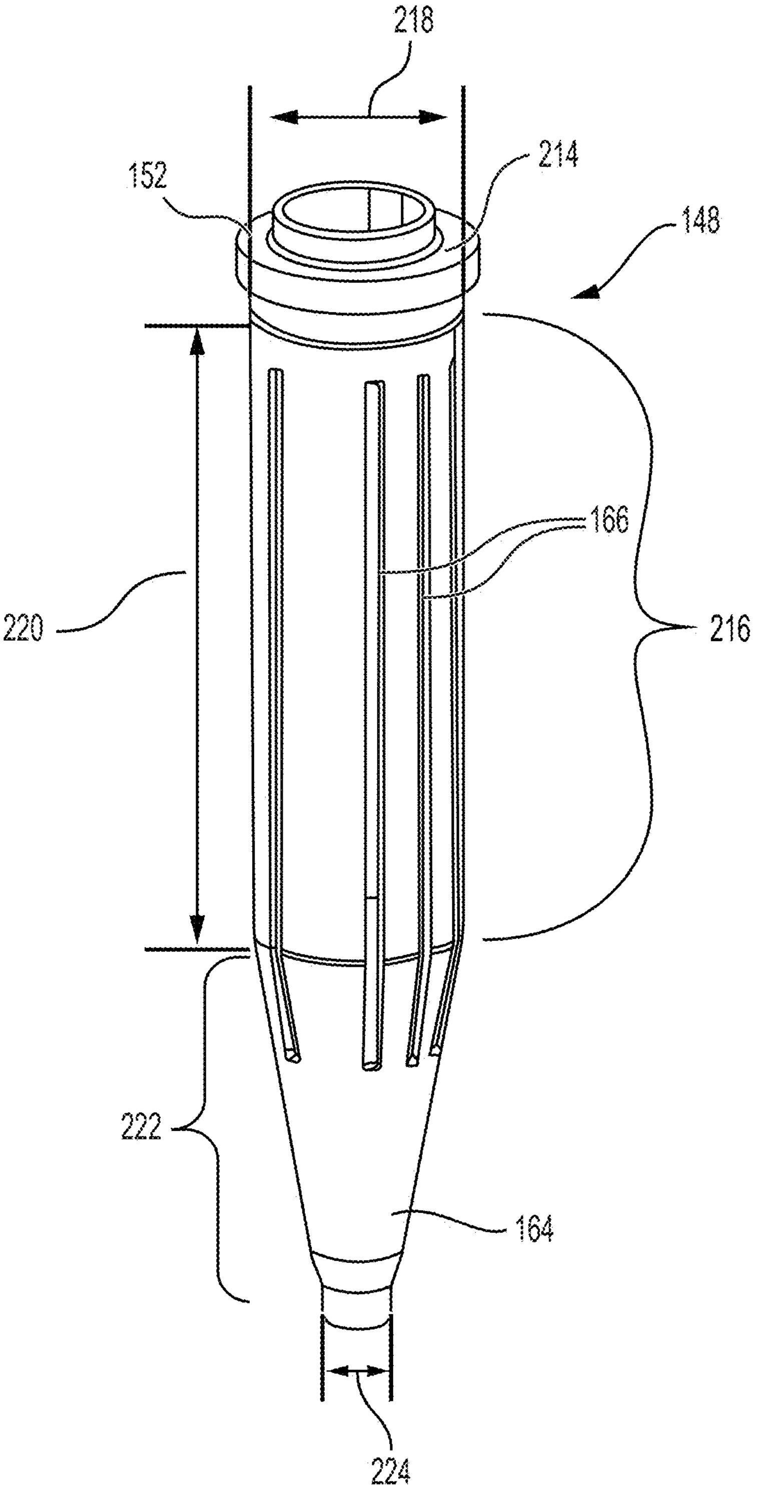
FIG. 6 is a schematic, perspective view of an illustrative embodiment of a vortex finder.

Referring now primarily to FIG. 6, features of an illustrative embodiment of the vortex finder 148 will be further described. The vortex finder 148 has, generally, a conical or funnel type shape. The first end 152 of the vortex finder 148 is formed with a mating flange 214, which is used to couple the vortex finder 148 to the cyclonic body portion 140. The mating flange 214 is a lip that rests on a shoulder on one end and butts against the upper flange connection. Rotational orientation is maintained via a pin.

A cylindrical portion 216 of the vortex finder 148 is coupled to the mating flange 214. The cylindrical portion 216 has a constant width 218 and a length 220. The cylindrical portion 216 is coupled to a conical portion 222. The conical portion 222 tapers from the width 218 to a smaller width 224 near the second end 164 of the vortex finder 148.

The change in the width of the vortex finder 148 from width 218 to width 224 alters the volume within the inner cavity 142 of the cyclonic body portion 140 and, correspondingly an internal volume of the vortex finder cavity 170 (FIG. 5), both of which may be varied to modifying the cyclonic flow of fluids within the cyclonic sand knockout device 104. In some embodiments, the width 218 is so that the cross sectional area within the inner cavity 142 through which fluid may flow proximate to width 218 is about 67 square inches and the width 224 is so that the cross sectional area within the inner chamber through which fluid may flow proximate to the width 224 is about 95 square inches.

Figure 7:
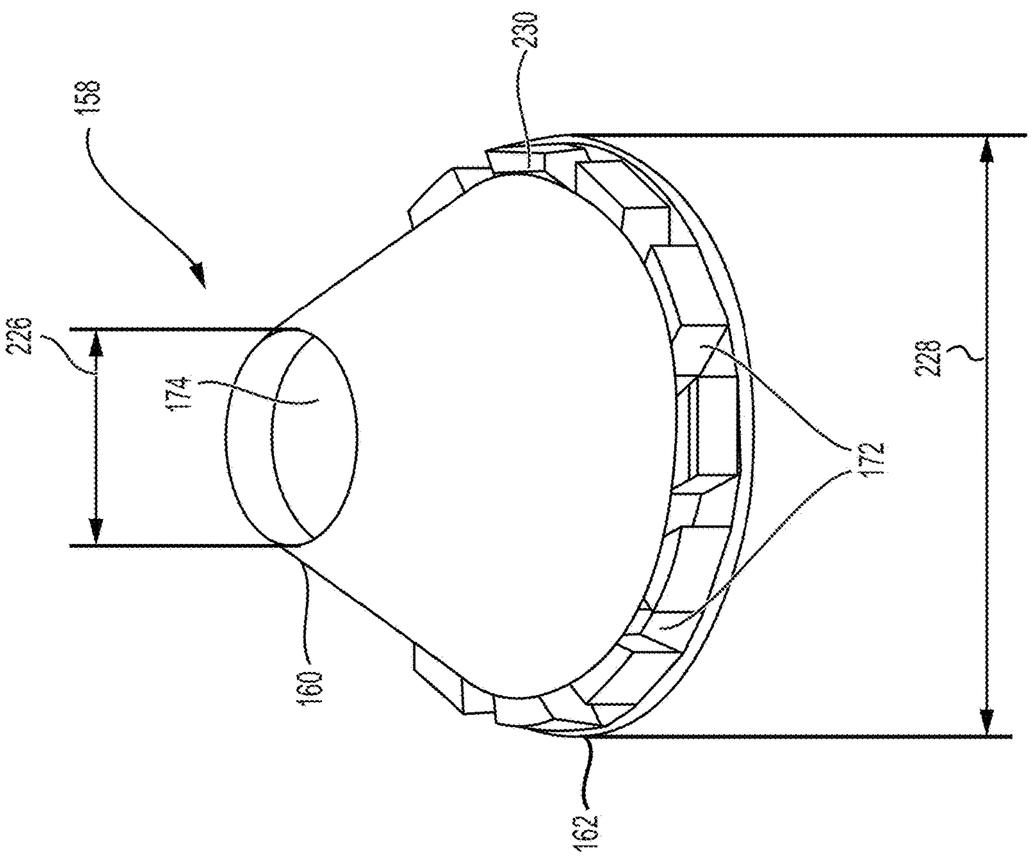
FIG. 7 is a schematic, perspective view of an illustrative embodiment of a dome.

Referring now to FIG. 7, features of an illustrative embodiment of the dome 158 will be further discussed. The dome 158 is, generally, funnel shaped, with the first end 160 having a width 226 and the second end 162 having a width 228, the width 226 being smaller than the width 228. A base portion 230 is formed on the second end 162 and is configured to be coupled to the second end 156 of the cyclonic body portion 140 within the inner cavity 142 of the cyclonic body portion 140. In some embodiments, the dome 158 rest on a mechanical lip of the body and is sandwiched in between an adjacent flange connection. The flow apertures 172 are formed within the base portion 230 to allow fluid flow into and out of the dome inner cavity 176 (FIG. 5). In some embodiments, the flow apertures 172 are angled within the base portion to promote flow of fluids through the flow apertures 172.

Referring primarily to FIG. 5, the cyclonic function of the cyclonic sand knockout device 104 will be further described. As described above, mixed media fluid 106 is introduced into the inner cavity 142 of the cyclonic body portion 140 through the mixed media fluid inlet 178. Preferably, the mixed media fluid inlet 178 is offset from the centerline 150 of the inner cavity 142 and oriented so that mixed media fluid 106 is introduced into the inner cavity 142 with a flow path substantially perpendicular to length 144 of the cyclonic body portion 140. In some embodiments, the mixed media fluid inlet 178 is oriented so that the flow path of the mixed media fluid 106 is directed more toward the second end 156 of the cyclonic body portion 140. In some embodiments, the mixed media fluid inlet 178 is oriented so the mixed media fluid 106 enters the inner cavity 142 at an angle between of 5 to 25 degrees relative to a horizontal cross sectional plane of the sand knockout device 104. In some embodiments, the mixed media fluid inlet 178 is oriented so that the flow path of the mixed media fluid 106 is directed more toward the second end 156 of the cyclonic body portion 140 and so the mixed media fluid 106 enters the inner cavity 142 at an angle between of 5 to 25 degrees relative to a horizontal cross sectional plane of the sand knockout device 104.

This configuration induces cyclonic flow of fluids within the inner cavity 142, where the fluids, driven by fluid pressure, are induced to travel in a circular, orbital, or cyclonic manner in the inner cavity 142 to form a vortex around the vortex finder 148 and the dome 158. As descried above, the widths of portions of the vortex finder 148, the dome 158, and the inner cavity 142 are sized and configured to promote generation of a vortex. The formation of the vortex results in fluids nearer the first end 154 of the cyclonic body portion 140 within the inner cavity 142 to flow with a greater velocity than fluids nearer to the second end 156 of the cyclonic body portion 140 within the inner cavity 142. Less dense fluids and materials within the vortex are able to remain within the portions of the inner cavity, i.e. nearer to the first end 154 of the cyclonic body portion 140, while denser fluids and material are pulled downward by gravity toward the second end 156 of the cyclonic body portion 140 within the inner cavity 142, since the fluid velocity in this area is relatively lower than nearer to the first end 154 of the cyclonic body portion 140. In this manner, the cyclonic sand knockout device 104 is able to separate the components of the mixed media fluid 106 having different densities.

Since the mixed media fluid 106 is primarily a mixture of oil, gas, water, and sand, these components may be separated by the cyclonic sand knockout device 104 based on their differences in density. Hydrocarbons, such as oil and gas typically have lower densities than water or sand. Therefore, the cyclonic flow of the mixed media fluid 106 within the inner cavity 142 can be used to separate the oil and gas from the sand and water. In this manner, the cyclonic sand knockout device 104 separates the mixed media fluid 106 into the first fluid mixture 110 and the second fluid mixture 112. The first fluid mixture 110 contains primarily oil or gas and is driven upward within the inner cavity 142 toward and into the vortex finder cavity 170 through the slotted openings 166 and lower center opening 168 of the vortex finder 148. From there, fluid pressure, results in the first fluid mixture 110 exiting the knockout device through the first fluid exit 132. In some embodiments, the slotted openings 166 are located closer to the first end 152 of the vortex finder 148 than to the second end 164 of the vortex finder 148.

A second fluid stream of the second fluid mixture 112 containing primarily sand and water is driven downward within the inner chamber through the flow apertures 172 or center opening 174 of the dome 158 and into the inner cavity 190 of the collection unit 186. The inner cavity 190 of the collection unit 186, as described above, is sized and configured to maintain the flow of the second fluid mixture 112 further into the inner cavity 190 to prevent or reduce reverse flow of the second fluid mixture 112 back into inner cavity 142 of the cyclonic body portion 140. The variations in the width 198 result in the second fluid mixture 112 within the first cylindrical portion 202, the conical portion 206, and the second cylindrical portion 208 having a greater flow velocity and fluid pressure than the second fluid mixture 112 located within the third cylindrical portion 212, which ensures fluid flow of the second fluid mixture 112 in the desired direction, which is into the third cylindrical portion 212. The third cylindrical portion 212 is the portion in the lower chamber 136 (FIG. 2) wherein the second fluid mixture, i.e., water and sand, is collected.

Figure 8:
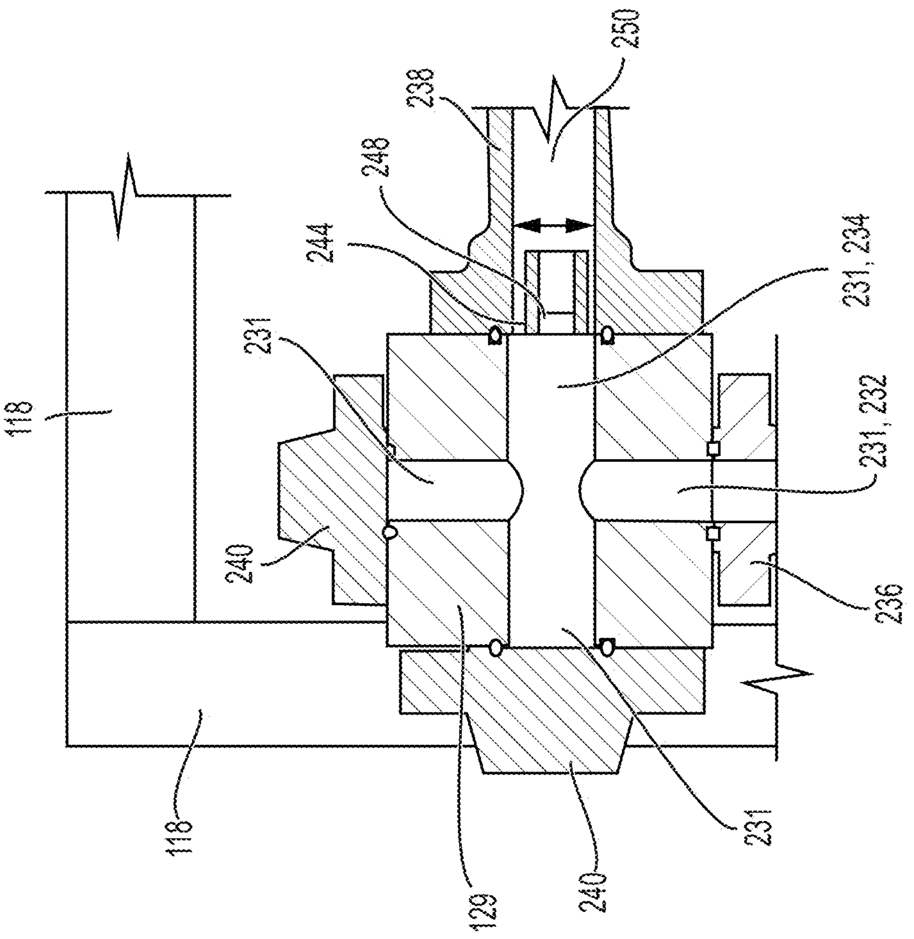
FIG. 8 is a schematic, cross-sectional view of an illustrative embodiment of a portion of a cyclonic sand knockout assembly.

Referring now to FIG. 8, additional aspects of the embodiment of the knockout assembly 116 will be discussed. FIG. 8 depicts a detailed view of a portion of the knockout assembly 116 of FIGS. 2, 3, and 4. As discussed above, the knockout assembly 116 includes flow blocks 129 that are used to direct the flow of fluids in the fluid input assembly 120 and the fluid output assembly 122. FIG. 8 depicts a flow block 129 of the of the fluid input assembly 120. The flow block 129 depicted in FIG. 8 is the final flow block that the mixed media fluid 106 passes through before flowing into the cyclonic sand knockout device 104. The flow block 129 includes flow passages 231 for receiving and directing fluids. As depicted, mixed media flows into the flow block 129 through an inlet flow passage 232 and out of an outlet flow passage 234. The inlet flow passage 232 is fluidly coupled to the inlet tubular 236. The outlet flow passage 234 is fluidly coupled to a flow adapter 238, which fluidly couples the flow block 129 to the mixed media fluid inlet 178 of the cyclonic body portion 140 (FIG. 4). The remaining flow passages 231 of the flow block 129 are blocked by caps 240. An adapter sleeve 244 is located at an inlet 248 of the flow adapter 238.

The adapter sleeve 244 is sized and configured to be coupled within the inlet 248 so that the adapter sleave 244 is retained within the inlet 248. The adapter sleave 244 may be coupled to the flow adapter 238 by a threaded connection, bolted connection, or press fit connection. Other connection methods may be used. In some embodiments, the adapter 238 is removably coupled to the flow adapter 238 for ease of replacement.

The adapter sleeve 244 is sized and configured with an inner diameter 250. The inner diameter 250 of the adapter sleeve 244 may be used to control, adjust, or modify the properties of the vortex formed within the cyclonic sand knockout device 104. As discussed, above, the flow of mixed media fluid 106 through the mixed media fluid inlet 178 and into the inner cavity 142 of the cyclonic sand knockout device 104 induces the formation of a vortex within the inner cavity 142. The velocity of the mixed media fluid 106 entering the inner cavity 142 may have an effect on the nature and qualities of the vortex within the inner cavity 142.

The adapter sleeve 244 may be used to adjust the velocity of mixed media fluid 106 entering the inner chamber. By reducing the inner diameter 250 of the adapter sleeve 244, the fluid pressure of the mixed media fluid 106 prior to entering the flow adapter is increased. This increase in pressure, in turn, results in an increase flow velocity of mixed media fluid 106 within the adapter sleeve 244. Therefore, the mixed media fluid 106 entering the inner cavity 142 of the cyclonic sand knockout device 104 will have a relatively increased fluid velocity. Conversely, increasing the inner diameter 250 of the adapter sleeve 244 results in a decrease in the velocity of the mixed media fluid 106 entering into the inner cavity 142. Therefore, the quality and nature of the vortex within the cyclonic sand knockout device 104 may be tuned or modified by use of different adapter sleeves 244 with different inner diameters 250. In some embodiments, the inner diameter is in the range of 2-5 inches. In some embodiments, the inner diameter 250 is about 3 inches. In some embodiments, the adapter sleave 244 is choke bean or choke bean like device available in ⅛ inch increments.

Figure 9:
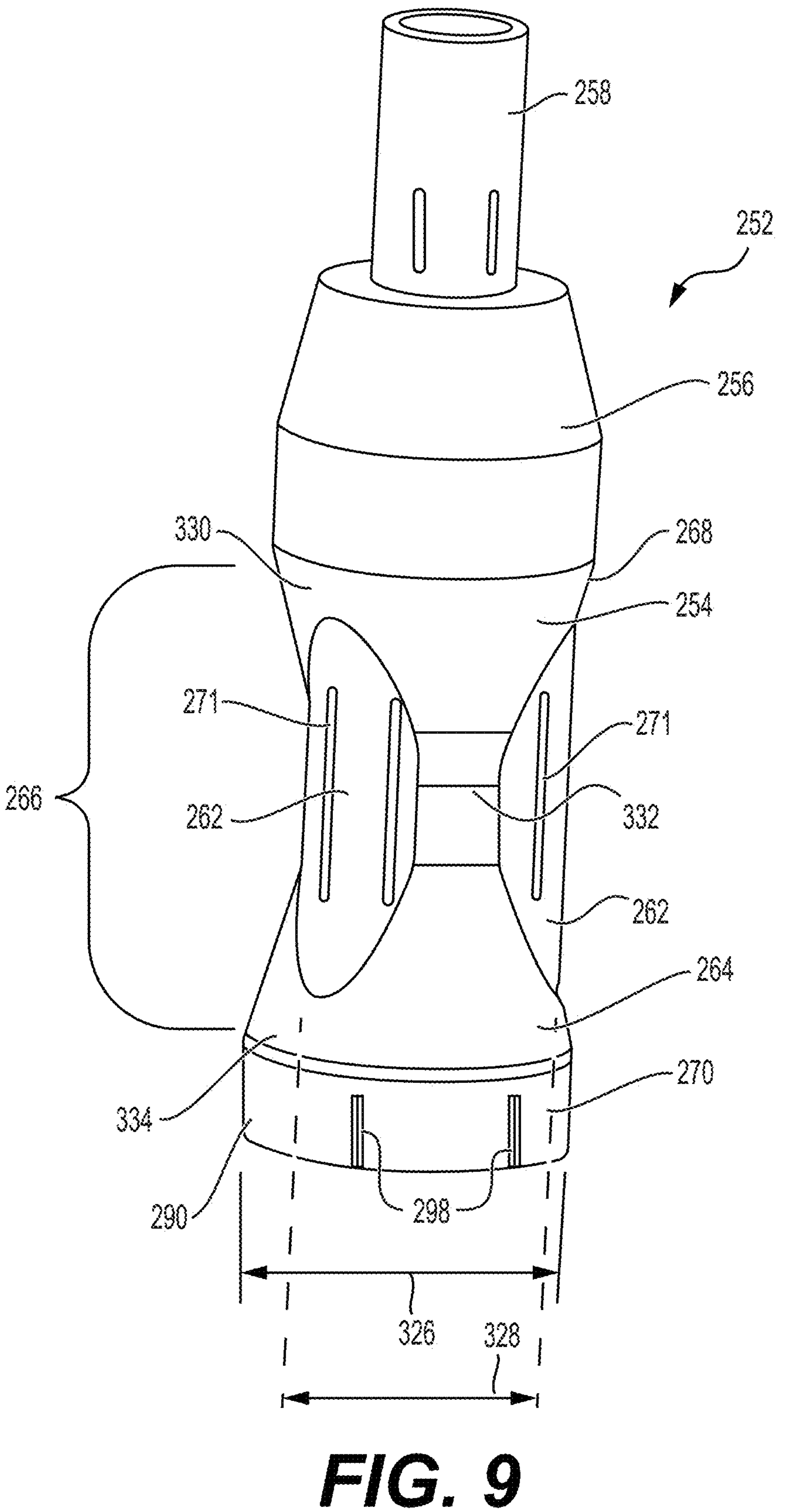
FIG. 9 is a schematic, perspective view of an illustrative embodiment of a vortex finder.
Figure 10:
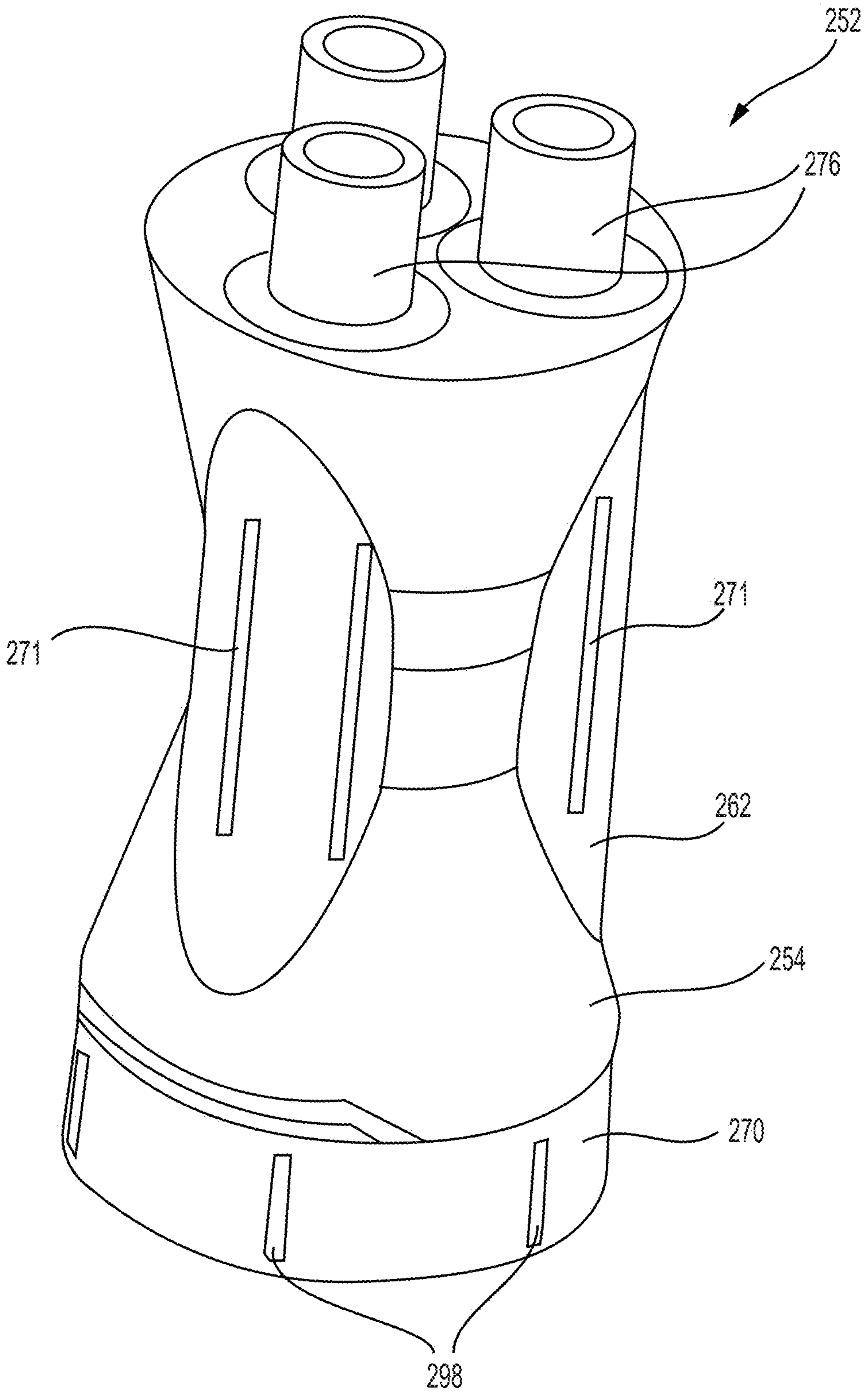
FIG. 10 is a schematic, perspective view of an illustrative embodiment of a portion of a vortex finder.
Figure 11:
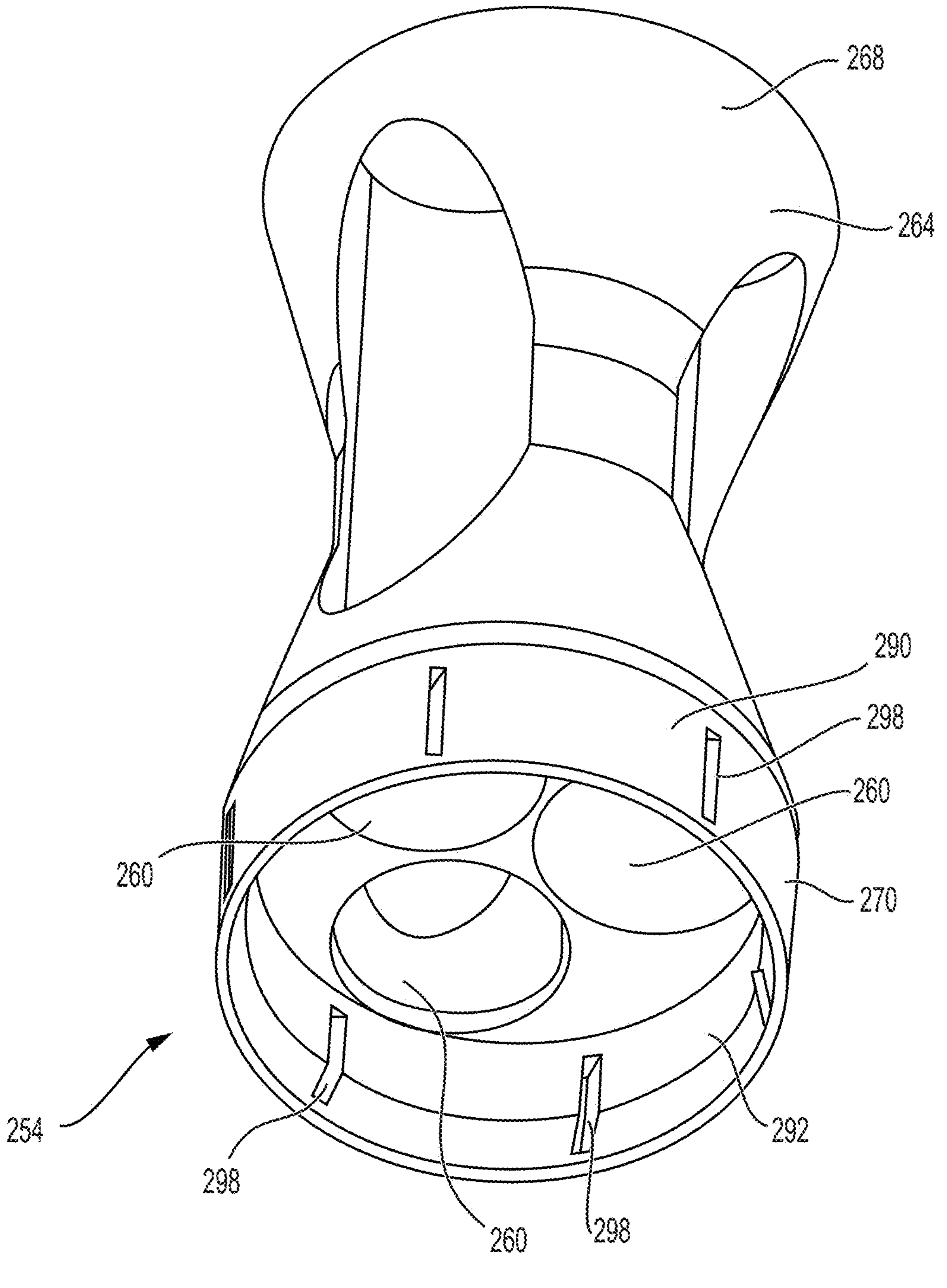
FIG. 11 is a schematic, perspective view of an illustrative embodiment of a body of a vortex finder.

Referring now to FIGS. 9-11, and initially to FIG. 9, an alternative illustrative embodiment of a vortex finder 252 of the cyclonic sand knockout device 104 is presented. The vortex finder 252 includes a body 254 coupled to a conical cap 256. A first fluid exit tube 258 is coupled to the conical cap 256. The body 254 is formed with three tubing apertures 260 (FIG. 11), which are each sized and configured to receive a flow tube 262. An outer wall 264 of the body 254 is configured with an inner taper portion 266 where the diameter of the body 254 is reduced, relative to the diameter of a first end 268 and of a second end 270 of the body 254, so that at least a portion of the flow tubes 262 are exposed when the flow tubes 262 are inserted into the tubing apertures 260.

Figure 12:
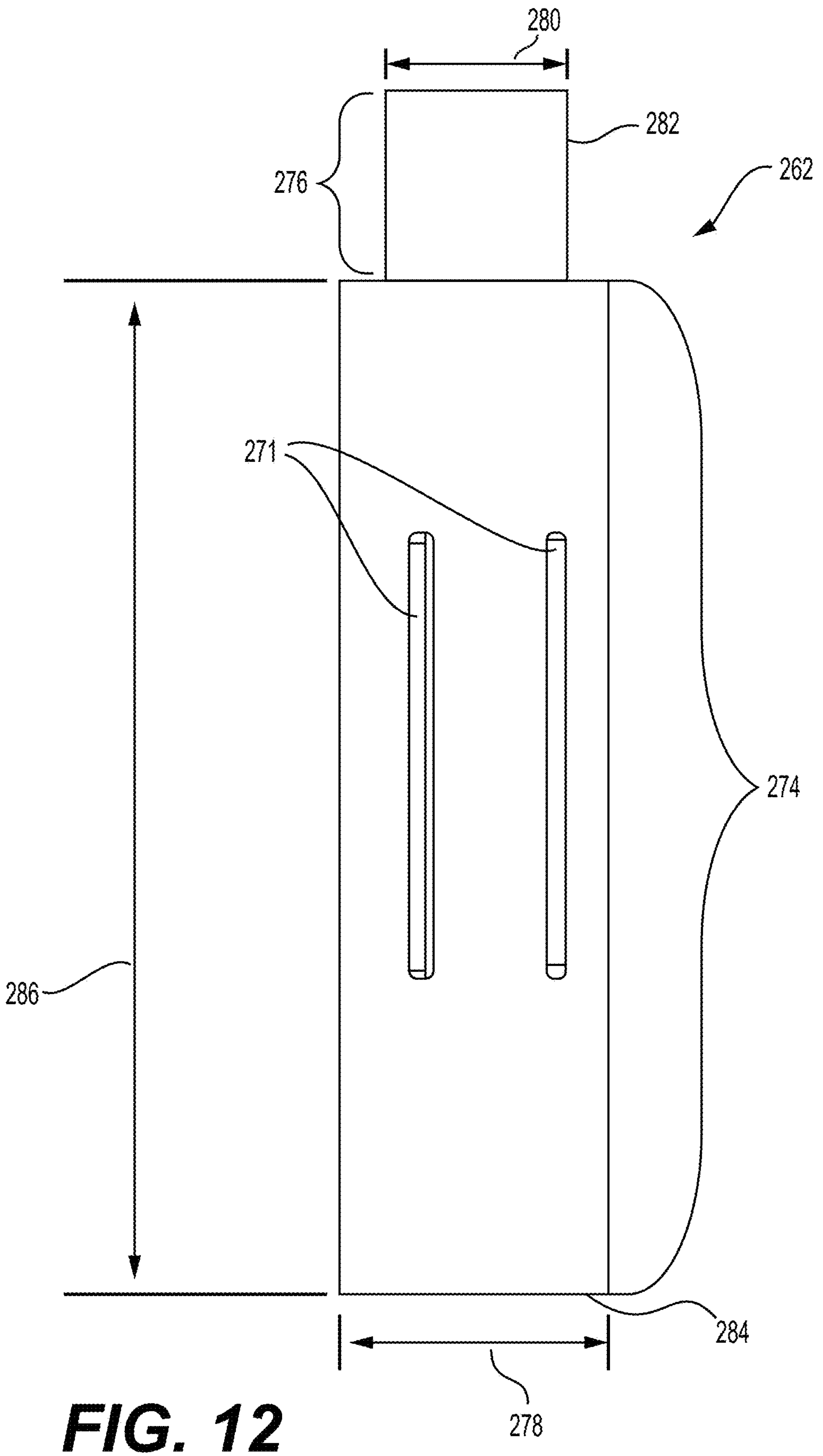
FIG. 12 is a schematic, perspective view of an illustrative embodiment of flow tube of a vortex finder.

Referring now primarily to FIG. 12, the flow tubes 262 are tubular members with a main body portion 274 and an upper extension portion 276. The main body portion 274 has a diameter 278. The upper extension portion 276 has a diameter 280. In some embodiments, such as depicted in FIG. 12, the diameter 278 of the main body portion 274 is larger than the diameter 280 of the upper extension portion 276. In other embodiments, other dimensions may be used. For example, the diameter 278 may be equal or smaller than the diameter 280. Since the flow tubes 262 are tubulars and a first end 282 and a second end 284 of the flow tubes 262 are open, fluid is able to flow through the flow tubes through the first end 282 and the second end 284. The flow tubes 262 are formed with apertures, such as apertures 271, which allow for fluid flow into and out of the flow tubes 262. The slots 272 are elongated apertures that are oriented along a length 286 of the main body portion 274. Apertures of other shapes and configurations may be used.

Figure 15:
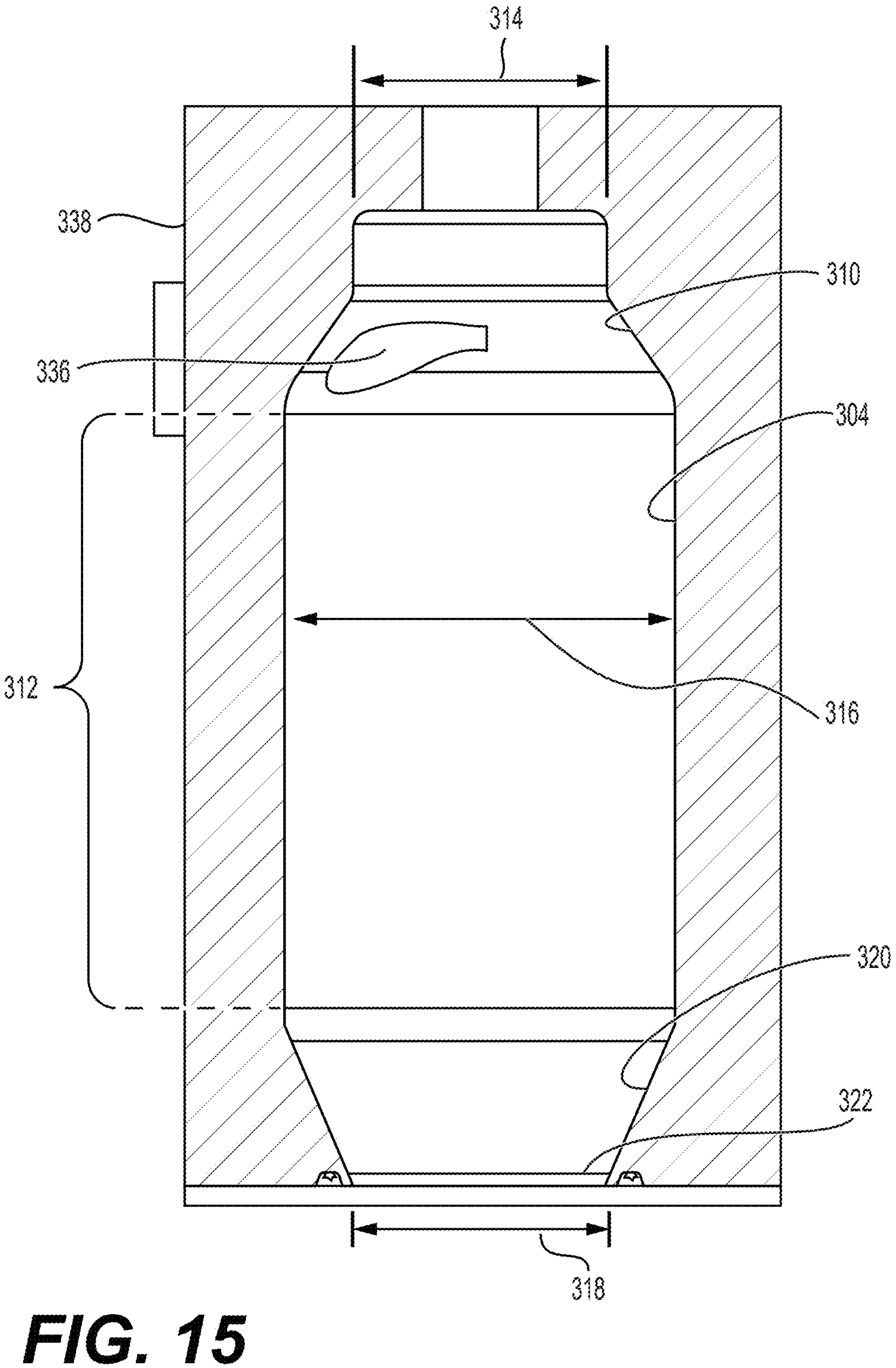
FIG. 15 is a schematic, cross-sectional view of a portion of an illustrative embodiment of a cyclonic sand knockout.

Referring now primarily to FIG. 10, the vortex finder 252 depicted in FIG. 10 is shown with the first fluid exit tube 258 and the conical cap 256 removed, for clarity. As can be seen in FIG. 10, the upper extension portions 276 of each of the flow tubes 262 protrudes from the body 254. When the vortex finder 252 is fully assembled, with the conical cap 256 in place, the upper extension portions 276 of each of the flow tubes 262 fit within and are received by apertures 288 of the conical cap 256 (FIG. 15). The second end 270 of the body 254 has one or more flow slots 298 formed within an outer wall 290. The outer wall 290 defines a lower cavity 292 (FIG. 11) of the vortex finder 252. When installed within the cyclonic sand knockout device 104, less dense material is able to enter into lower cavity 292 through the open bottom of the body 254 or through the flow slots 298.

Figure 13:
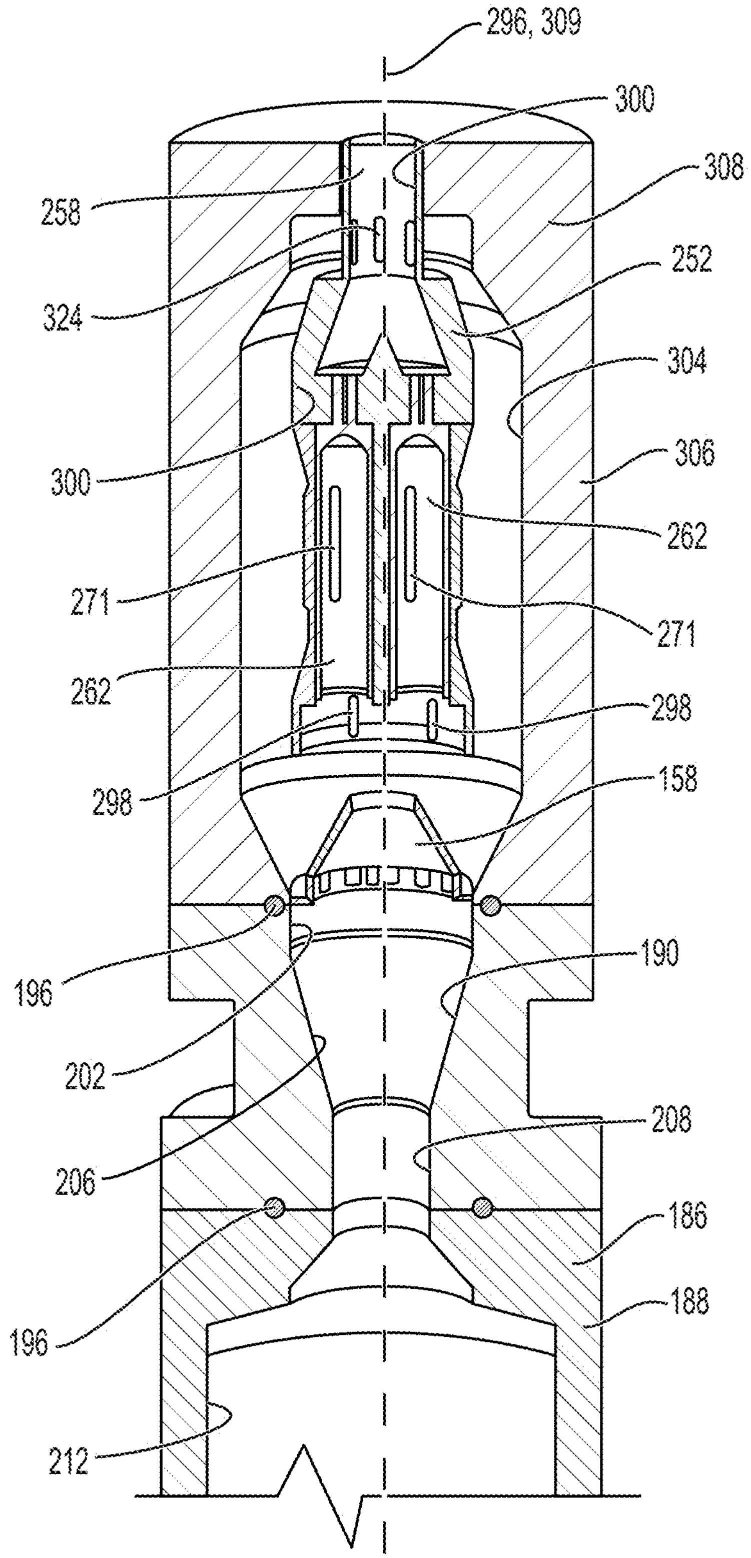
FIG. 13 is a schematic, cross-sectional view of a portion of an illustrative embodiment of a cyclonic sand knockout.
Figure 14:
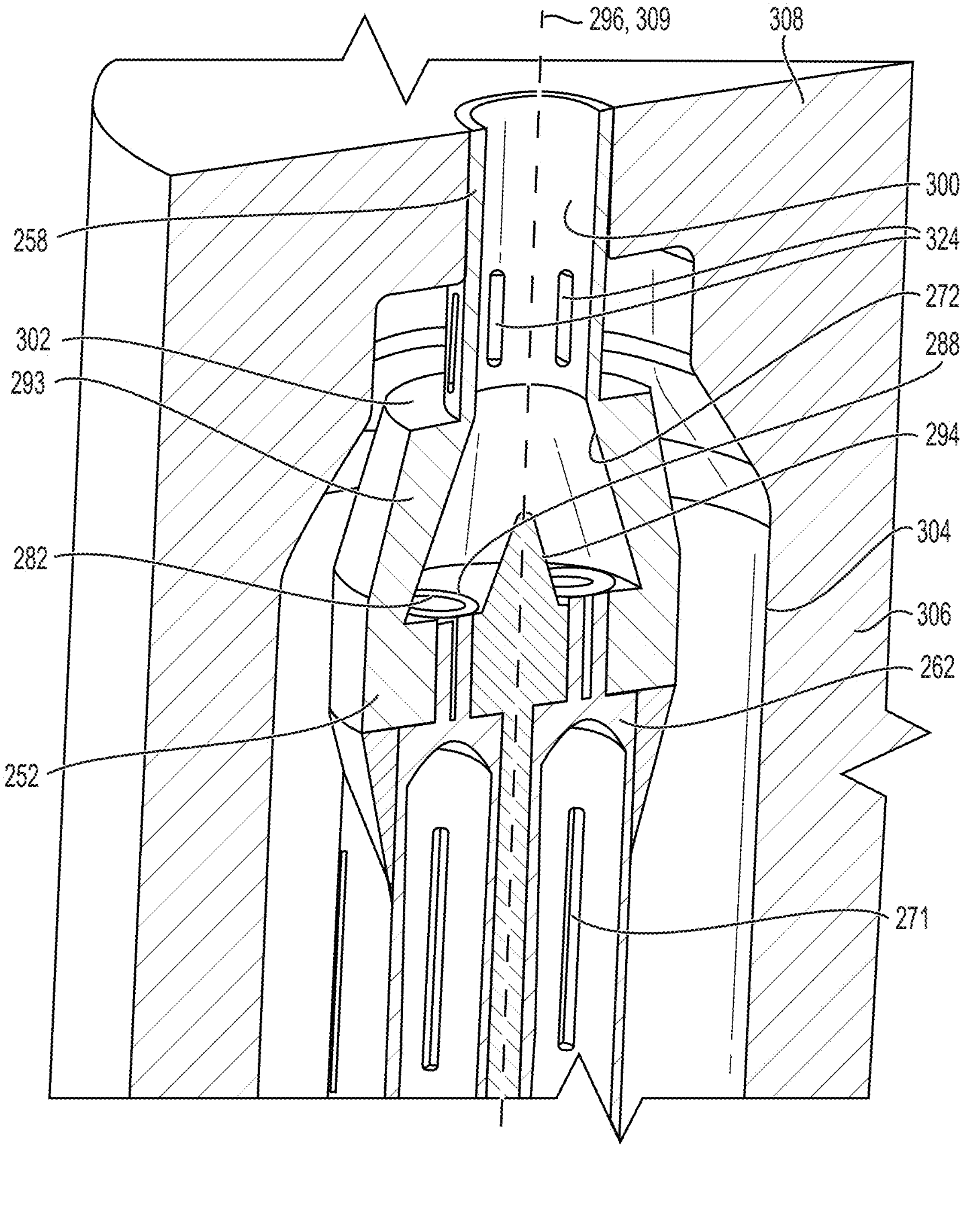
FIG. 14 is a schematic, cross-sectional view of a portion of an illustrative embodiment of a cyclonic sand knockout.

Referring now primarily to FIGS. 13, 14, and 15, further aspects of the cyclonic sand knockout device 104 utilizing the vortex finder 252 will be discussed. FIG. 13 depicts a cross-sectional view of the vortex finder 252 installed within the cyclonic sand knockout device 104. FIG. 14 depicts a cross-sectional perspective view of a portion of the vortex finder 252 installed within the cyclonic sand knockout device 104.

As discussed above, the upper extension portions 276 of each flow tube 262 are received by apertures 288 within the conical cap 256. The conical cap 256 is formed from a body 293. The body 293, generally, has a funnel shape with the conical cap cavity 272 located on the interior of the funnel like shape of the conical cap 256. The conical cap 256 includes a center nose cone 294, which is located coincident to an axial centerline 296 of the vortex finder 252 and protrudes into the conical cap cavity 272 between the apertures 288. The conical shape of the nose cone 294 induces fluid flow exiting the first end 282 of the flow tubes 262 to flow from the conical cap cavity 272 into an interior cavity 300 of the first fluid exit tube 258.

The first fluid exit tube 258 is a tubular member coupled to a first end 302 of the conical cap 256. One or more apertures 324 are formed within the first fluid exit tube 258 to allow for fluid flow into or out of the interior cavity 300 of the first fluid exit tube 258.

In a manner analogous to the illustrative embodiment of the vortex finder 148 of FIG. 5, the vortex finder 252 is coupled to the cyclonic body portion 140 of the cyclonic sand knockout device 104 within an inner cavity 304 formed within a body 306 of the cyclonic body portion 140. The vortex finder 252 is located within the inner cavity 304 coincident with an axial centerline 309 of the cyclonic body portion 140. Also analogous to the illustrative embodiment of FIG. 5, the vortex finder 252 is coupled proximate a first end 308 of the cyclonic body portion 140 so that the vortex finder 252 is suspended above a dome 158. The dome 158 of FIG. 13 is analogous to the dome 158 of FIGS. 5 and 7 and functions in the same manner as described in relation to FIG. 5.

Referring now primarily to FIG. 15, features of an illustrative embodiment of the inner cavity 304 will be described. The inner cavity 304 is sized and configured to complement the size and configuration of the vortex finder 252 to induce a vortex. A first end 310 of the inner cavity 304 is formed with a constricted cross-sectional radius, relative to a central portion 312 of the inner cavity 304. The first end 310 of the inner cavity 304 has a width 314, which tapers to a wider width 316 of the central portion 312 of the inner cavity 304. A second end 320 of the inner cavity 304, likewise, has a reduction in diameter that tapers from the width 316 of the central portion 312 to a narrower width 318 proximate to a lower exit 322 of the inner cavity 304 where the dome 158 is located. In some embodiments, the width 316 is adjusted to provide a cross sectional area of at least part of the central portion 312 of 90-150 square inches. In some embodiments, the width 316 is adjusted to provide a cross sectional area of at least part of the central portion 312 of the inner cavity 304 of 110-130 square inches. In some embodiments, the width 318 is adjusted to provide a cross sectional area proximate to the lower exit 322 of the inner cavity 304 of 60-120 square inches. In some embodiments, the width 318 is adjusted to provide a cross sectional area proximate to the lower exit 322 of the inner cavity 304 of 70-90 square inches. In some embodiments, the width 316 is adjusted to provide a cross sectional area of at least part of the central portion 312 of the inner cavity 304 of 110-130 square inches and the width 318 is adjusted to provide a cross sectional area proximate to the lower exit 322 of the inner cavity 304 of 70-90 square inches.

Analogous to the illustrative embodiment of FIG. 5, an inlet 336 is formed within the body 306. The inlet 336, on an exterior 338 of the body 306, is coupled to the fluid input assembly 120 (FIG. 2) and provides a flow path for mixed media fluid 106 to enter the inner cavity 304. The first end first end 310 of the inner cavity 304 is likewise fluidly coupled to the fluid output assembly 122 to provide a flow path for the first fluid mixture 110 to exit the cyclonic sand knockout device 104. The second end 320 of the inner cavity 304 is likewise fluidly coupled to the collection unit 186 to provide a flow path for the second fluid mixture 112 to exit the cyclonic body portion 140. The second fluid mixture is collected within the collection unit 186 in a manner analogous to that described in relation to the illustrative embodiments of FIGS. 2 and 5.

Referring now primarily to FIGS. 13 and 14, the vortex function of the illustrative embodiment of the cyclonic sand knockout device 104 and vortex finder 252 will be described. The illustrative embodiment of the cyclonic sand knockout device 104 and vortex finder 252 operates in a manner that is analogous to that of the illustrative embodiment of FIG. 5. Mixed media fluid 106 is introduced into the inner cavity 304 under fluid pressure at an angle and direction to induce formation of a fluid vortex within the inner cavity 304. The formation of the vortex within the inner cavity 304 results in generally relatively lower fluid pressures and lower cyclonic flow nearer to the second end 320 of the inner cavity 304 and generally relatively high pressures and larger velocity cyclonic flow nearer to the first end 310 of the inner cavity 304. This differential in pressures and velocities induces the mixed media flow 106 to separate in the first fluid mixture 110 and the second fluid mixture 112. The less dense first fluid mixture 110 is pushed toward the first end 310 of the inner cavity 304, into the flow tubes 262 (through the apertures 271 or the second end 284 of the flow tubes 262 (FIG. 12)), into the conical cap cavity 272, into the interior cavity 300 of the first fluid exit tube 258, and ultimately into the fluid output assembly 122 (FIG. 2). The more dense second fluid mixture 112 is pushed toward the second end 320 of the inner cavity 304, through the center opening 174 or flow apertures 172 of the dome 158 (FIG. 7), and ultimately into the collection unit 186.

As described above, the vortex finder 252 includes apertures 324 formed within the first fluid exit tube 258. The apertures 324 provide a direct exit from the inner cavity 304 for gasses contained within the mixed media fluid 106.

As described above, the body 254 of the vortex finder 252 is formed with the inner taper portion 266, which has diameter that tapers from a larger diameter 326 to a smaller diameter 328 from a first end 330 of the inner taper portion 266 to a middle point 332 of the inner taper portion 266 and then tapers from the middle point 332 back to the larger diameter 326 at a second end 334 of the inner taper portion 266.

When coupled within the inner cavity 304, the tapered features of the body 254 of the vortex finder 252 result in modification and tuning of the vortex within the inner cavity 304. The volumes of the inner cavity 304 affect the quality and nature of the vortex. Since the body 254 has a larger diameter near the first end 330 and the second end 334, there is, relatively, less volume for the cyclonically flowing fluid to occupy proximate to the first end 330 and the second end 334 as compared to the volume proximate to the middle point 332 of the body 254. This results in relatively higher velocity cyclonic fluid flow in the areas of constriction, as compared to the areas with greater volume. In this manner, the vortex finder 252, concentrates the less dense components proximate to the middle point 332 or between the first end 330 and the second end 334. Since the apertures 271 of the flow tubes 262 are located within the inner taper portion 266 of the body 254 and are exposed to fluid flow within the inner cavity 304, the less dense material concentrated proximate to the inner taper portion 266 is able to flow into the flow tubes 262 and pass through the other components of the cyclonic sand knockout device 104 as, ultimately, the first fluid flow 110.

In some embodiments, the flow of fluids into and out of the inner cavity 304 is defined or modified by the available volume for fluids to flow into or out of the inner cavity 304.

For example, in some embodiments, the inlet 248 is sized and configured so that the inlet 248 has a cross-sectional area defining the volume of fluid that may flow through the inlet 248 and the flow tubes 262 have a total cross-sectional area defining the volume of fluid that may flow through the plurality of flow tubes 262. In some embodiments, the cross-sectional area of the inlet 248 is substantially equal to the total cross-section area of the flow tubes 262 so that substantially the same volume of fluid may flow through the inlet 248 that flows through the flow tubes 262 at the same or substantially same fluid pressures. In some embodiments, the cross-sectional area of the first fluid exit tube 258 defines the amount of fluid that may exit the inner cavity 304. In some embodiments, the cross-sectional area of the first fluid exit tube 258 is equal to or substantially equal to the cross-sectional area of the inlet 248. In some embodiments, the cross-sectional area of the inlet 248 is within 5 percent of the total cross-section area of the flow tubes 262 or of the cross-sectional area of the first fluid exit tube 258. In some embodiments, the cross-sectional area of the inlet 248 is within 10 percent of the total cross-section area of the flow tubes 262 or of the cross-sectional area of the first fluid exit tube 258.

While many examples are possible and some have been presented, additional examples follow.

Example 1. A cyclonic sand knockout device for connection to a wellhead, the cyclonic sand knockout device comprising:

- a cyclonic head assembly for receiving a mixed media fluid from the wellhead, the cyclonic head assembly operable to separate the mixed media fluid into a first fluid mixture and a second fluid mixture, such that the second fluid mixture contains a higher concentration of sand, the cyclonic head assembly comprising:
  - a separating body having an outer wall and an inner wall, the inner wall at least partially defining a cyclonic cavity,
  - an inlet extending though the body from the outer wall to the inner wall, the inlet configured to deliver the mixed media fluid from the wellhead to the cyclonic cavity, and
  - a vortex finder positioned in the cyclonic cavity, the vortex finder comprising a conical body, a neck extending from a first end of the conical body, a plurality of tubes extending from a second end of the conical body, an exit port positioned within the neck and extending the length thereof, and a plurality of directional vents extending through the neck, the plurality of directional vents fluidly connecting an upper portion of the cyclonic cavity to the exit port, wherein the plurality of tubes and the plurality of directional vents are configured to receive the first fluid mixture;
- an adapter spool connected to the head assembly, the adapter spool configured to receive the second fluid mixture from the cyclonic head assembly, the adapter spool comprising a funnel section, an adapter neck, and an expansion section; and
- a lower catch vessel for containing the second fluid mixture.

Example 2. A cyclonic sand knockout device for connection to a wellhead, the cyclonic sand knockout device comprising:

- a cyclonic head assembly having a first end and a second end, the cyclonic head assembly for receiving a mixed media fluid from the wellhead, the cyclonic head assembly operable to separate the mixed media fluid into a first fluid mixture and a second fluid mixture, such that the second fluid mixture contains a higher concentration of sand, the cyclonic head assembly comprising:
  - a body having an outer wall and an inner wall, the inner wall at least partially defining a cyclonic cavity, the cyclonic cavity having a first end and an opposing, second end,
  - a mixed media fluid inlet extending though the body from the outer wall to the inner wall, the mixed media fluid inlet configured to deliver the mixed media fluid from the wellhead to the cyclonic cavity, wherein the mixed media fluid inlet is angled downward toward the second end of the cyclonic cavity, and
  - a vortex finder positioned in the cyclonic cavity, the vortex finder comprising a sleeve, the sleeve having an outer wall and an inner wall with the inner wall defining a sleeve passage, the sleeve having a plurality of vents extending therethrough, the plurality of vents configured to encourage separation of the mixed media fluid into the first fluid mixture and the second fluid mixture and to receive the first fluid mixture into the sleeve passage, an exit port fluidly at a first end of the sleeve for evacuating the first mixed media fluid from the cyclonic head assembly,
  - a dome deflector connected to a second end of the sleeve, the dome deflector having a plurality of slots extending from an outer wall to an inner wall, the slots configured to receive the second fluid mixture to evacuate the second fluid mixture from the cyclonic head assembly, the dome deflector configured to prevent the second fluid mixture from remixing with the first fluid mixture;
- an adapter spool connected to the second end of the head assembly, the adapter spool configured to receive the second fluid mixture from the cyclonic head assembly, the adapter spool comprising a first section, a second, funnel section, and a third section, the first section of the adapter spool adjacent to the dome deflector; and
- a lower catch vessel for containing the second fluid mixture.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A cyclonic sand knockout device comprising:

- a body having an inner cavity, wherein the inner cavity has a first end and a second end;
- a vortex finder having a first end and a second end disposed within the inner cavity, wherein the vortex finder is coupled to the body proximate to the first end of the vortex finder and proximate to the first end of the inner cavity;
- a dome disposed within the inner cavity having a first end, a second end, and an inner cavity, wherein the dome is coupled to the body proximate to the second end of the dome and proximate to the second end of the inner cavity;
- an inlet in fluid communication with the inner cavity formed within the body for introducing fluids into the inner cavity of the body;

a first fluid exit in fluid communication with the inner cavity formed within the body proximate to the first end of the inner cavity;

a collection chamber in fluid communication with the inner cavity formed within the body and coupled to the body proximate to the second end of the inner cavity;

wherein the first end of the dome, the second end of the dome, and the inner cavity of the dome are each in fluid communication with each other and are in fluid communication with the collection chamber;

wherein the vortex finder comprises a tubular member having a first end, a second end, and an inner cavity, wherein the first end, second end, and inner cavity of the tubular member are in fluid communication with each other;

wherein the tubular member of the vortex finder has a plurality of flow apertures formed therein, each of the plurality of flow apertures being an elongated slit oriented along a length of the tubular member and being in fluid communication with the inner cavity of the body and being in fluid communication with the inner cavity of the tubular member; and wherein each of the plurality of flow apertures of the tubular member are located closer to the first end of the tubular member than to the second end of the tubular member.

2. The cyclonic knockout device of claim 1, wherein a diameter of the tubular member of the vortex finder is equal to a first diameter proximate to the first end of the tubular member and to a second diameter proximate to the second end of the tubular member; and wherein the first diameter is larger than the second diameter.

3. The cyclonic knockout device of claim 2, wherein the tubular member of the vortex finder has a constant diameter portion proximate to the first end of the tubular member;

wherein the tubular member of the vortex finder has a tapered diameter portion proximate to the second end of the tubular member; and wherein the diameter of the tubular member in the tapered diameter portion tapers from the first diameter to the second diameter.

4. The cyclonic knockout device of claim 1, wherein a plurality of dome flow apertures are formed within a body of the dome proximate to the second end of the dome; and wherein each of the plurality of flow apertures are in fluid communication with the inner cavity of the body of the cyclonic sand knockout device and are in fluid communication with the inner cavity of the dome.

5. The cyclonic knockout device of claim 4, wherein the first end of the dome has a first diameter and the second end of the dome has a second diameter;

wherein a diameter of the body of the dome tapers from the first diameter to the second diameter; and wherein the second diameter is larger than the first diameter.

6. The cyclonic knockout device of claim 1, wherein the inlet is configured to introduce fluids into the inner chamber with a fluid flow that is substantially perpendicular to a radial axis of the body.

7. The cyclonic knockout device of claim 1, wherein the second end of the vortex finder is disposed proximate to, but not in contact with, the first end of the dome.

8. The cyclonic knockout device of claim 1, wherein a diameter of the tubular member of the vortex finder is equal to a first diameter proximate to the first end of the tubular member and to a second diameter proximate to the second end of the tubular member;

wherein the first diameter is larger than the second diameter;

wherein the tubular member of the vortex finder has a constant diameter portion proximate to the first end of the tubular member;

wherein the tubular member of the vortex finder has a tapered diameter portion proximate to the second end of the tubular member;

wherein the diameter of the tubular member in the tapered diameter portion tapers from the first diameter to the second diameter;

wherein a plurality of dome flow apertures are formed within a body of the dome proximate to the second end of the dome;

wherein each of the plurality of flow apertures of the dome are in fluid communication with the inner cavity of the body of the cyclonic sand knockout device and are in fluid communication with the inner cavity of the dome;

wherein the first end of the dome has a first diameter and the second end of the dome has a second diameter;

wherein a diameter of the body of the dome tapers from the first diameter to the second diameter;

wherein the second diameter is larger than the first diameter; and wherein the second end of the vortex finder is disposed proximate to, but not in contact with, the first end of the dome.

* * * * *